(No Model.) 2 Sheets—Sheet 1.
W. SCHOFIELD.
SHAFT COUPLER.
No. 317,955. Patented May 12, 1885.
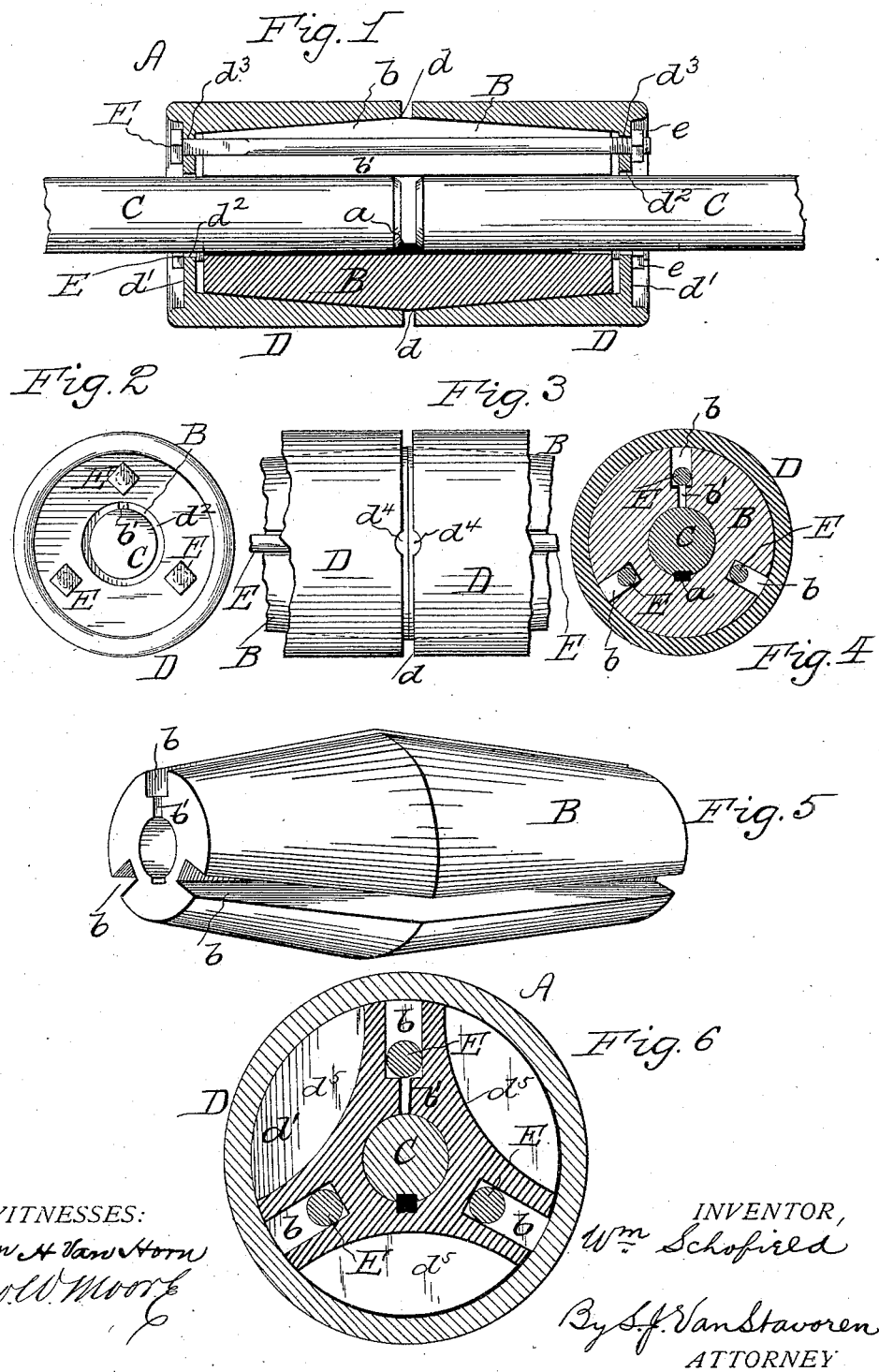
WITNESSES:
Wm H Van Horn
Geo W Moore
INVENTOR,
Wm Schofield
By S. J. Van Stavoren
ATTORNEY

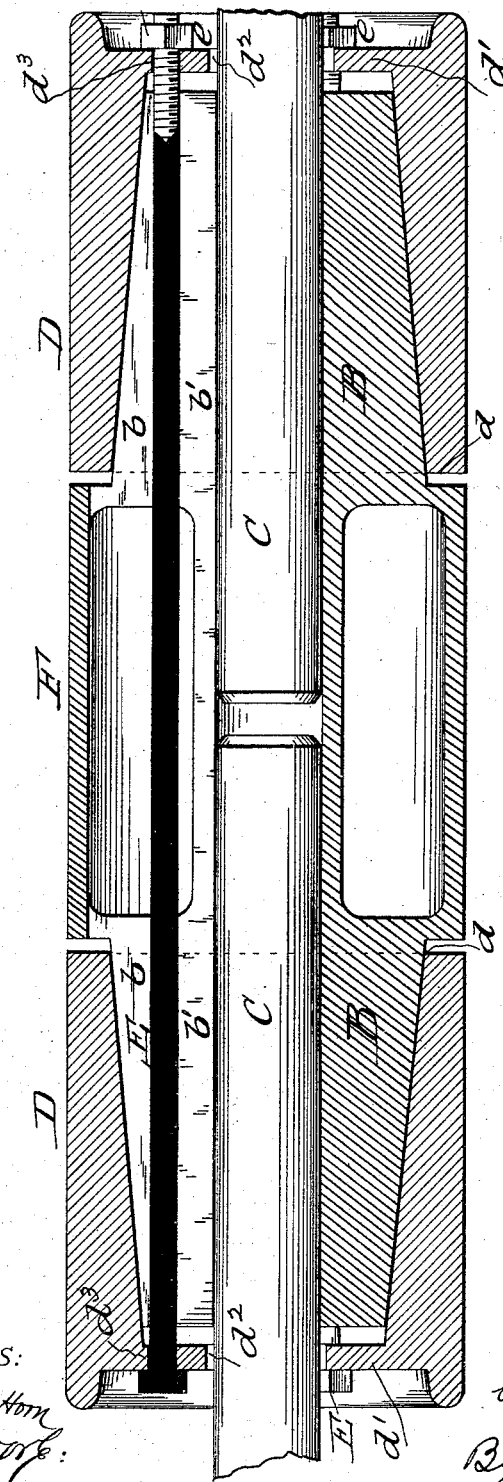

United States Patent Office.

WILLIAM SCHOFIELD, OF PHILADELPHIA, PENNSYLVANIA.

SHAFT-COUPLER.

SPECIFICATION forming part of Letters Patent No. 317,955, dated May 12, 1885.

Application filed August 14, 1884. Renewed April 9, 1885. (No model.)

*To all whom it may concern:*

Be it known that I, WILLIAM SCHOFIELD, a citizen of the United States, residing at Philadelphia, in the county of Philadelphia and State of Pennsylvania, have invented certain new and useful Improvements in Shaft-Couplers, of which the following is a specification, reference being had therein to the accompanying drawings, wherein—

Figure 1 is a longitudinal vertical section of a shaft-coupler embodying my invention. Fig. 2 is an end view. Fig. 3 is a broken plan. Fig. 4 is a transverse section. Fig. 5 is a perspective of the double-cone sleeve. Fig. 6 is a transverse section of a coupler having skeleton or exterior longitudinally-corrugated double-cone sleeve, and Fig. 7 is a longitudinal vertical section of a coupler adapted for use where extended length of coupling-surface is desired.

My invention has relation to shaft-couplers of that form composed of a double-cone coupling-sleeve and sectional binding or clamping sleeves or casings surrounding the cones; and it has for its object to so bolt or connect the parts of the coupler together, and to the shafts to be coupled, that the latter cannot rotate independently of one another, and also to cheapen the manufacture of the coupler, and render it more compact, durable, and effective, and which can readily and easily be connected to and disconnected from the coupled shafts.

My invention accordingly consists of the novel combination, construction, and arrangement of parts, as hereinafter described and claimed, having reference particularly to a double-cone sleeve having longitudinal grooves radially arranged in its periphery, one of which is extended to the bore of the cones, and of two surrounding clamping-sleeves having closed outer ends, and which are connected to or clamped upon the cones by means of bolts, which pass through openings in the ends of the sleeves, and through the longitudinal grooves in the cones.

In the drawings, A represents the coupler, composed of a double-cone sleeve, B, which is keyed or otherwise secured, as indicated at $a$, to one or both shafts, C C, designed to be coupled. This double-cone sleeve has longitudinal grooves or slots $b$ formed in its periphery to make it more elastic when subjected to clamping-pressure. These slots are radially disposed, and of which three are preferably employed, and they extend from end to end of the sleeve B. One of them is radially continued into the bore of the sleeve to form a narrow slit or kerf, $b'$, to permit the sleeve, when subjected to a binding action, to securely clamp itself upon both shafts to be coupled. The double-cone sleeve B is preferably formed in one piece, as shown; but, if desired, it may be composed of two sections parted either transversely or longitudinally.

D D represent the clamping or binding sleeves, of which there are two, having open ends $d$ and closed ends $d'$, provided with shaft-openings $d^2$ and bolt-apertures $d^3$, which align or register with the double-cone slots $b$, as shown. The bores of the sleeves D are tapered to correspond to and fit the incline or angle of the cones on sleeve B.

E E represent the clamping-bolts, which may be ordinary square-neck or carriage bolts, as indicated in Fig. 1, or long square bolts, as illustrated in Fig. 7. These bolts pass through the apertures $d^3$ in the ends of the sleeves D, and also through and rest in the slots $b$ of double-cone sleeve B, so that when said parts are mounted upon the shafts C C the bolts E firmly unite the double-cone sleeve B to the outer sleeves D, and prevent independent rotation of same. By tightening the bolt-nuts $e$ the sleeves D are drawn together, and this action binds the sleeves D upon the double cone B, and causes the latter to firmly clamp itself upon the shafts C C, so that one cannot revolve without the other.

To remove the coupler from the shafts, the bolt-nuts $e$ are first loosened and a wedged or otherwise shaped tool is inserted between the open ends or meeting edges of the sleeves D, to drive or force them apart or relieve their clamping impingement upon the double-cone sleeve B. To facilitate the accomplishment of the last-described result, or provide sufficient space at any one between the meeting edges of sleeves D, such edges are provided with registering nicks or recesses $d^4$, as shown in Fig. 3. In large couplings the periphery of the double-cone sleeve may be longitudinally cut out, recessed, or corrugated, as indicated at $d^5$ in Fig. 6, to reduce its weight or lessen the amount of metal required therefor.

When an extended length of coupler is required, the double-cone sleeve B is constructed as shown in Fig. 7, or has a central hollow cylindrical part, F, which affords the necessary length of coupler without materially adding to its weight. This form of coupler is in all other respects of the same construction as above described.

It will be noted that the heads and nuts of the bolts E impinge upon the closed ends of the sleeves B, and not against the ends of the double cones; consequently the latter is free from end-pressure to permit it to be exceedingly sensitive to any binding action of the sleeves B.

What I claim is—

1. A shaft-coupler composed of double-cone sleeve B, having slots $b$ and kerf $b'$, clamping-sleeves D D, having ends $d$, with apertures $d^3$, and clamping-bolts E, passing through said apertures $d^3$ and slots $b$, substantially as shown and described.

2. In a shaft-coupler having a solid or single double-cone sleeve and sectional or two binding clamping-sleeves with outer perforated ends, of clamping-bolts for uniting the double-cone and clamping sleeves, and for binding or coupling the cone-sleeve to the shafts, substantially as shown and described.

3. The coupling A, composed of double-cone sleeve B, having longitudinal slots $b$ in its periphery, and one of said slots terminating in a kerf, $b'$, of the sleeves D, having open or meeting edges $d$ and closed ends $d'$, provided with shaft-openings $d^2$ and apertures $d^3$, and of bolts E, passing through said apertures $d^3$ and slots $b$, substantially as shown and described.

4. The coupling A, as herein shown and described, having sleeves D, the meeting edges $d$ of which are provided with registering nicks or recesses $d^4$, as and for the purpose set forth.

5. In a shaft-coupling, as herein shown and described, the double-cone sleeve B, having central cylindrical part, F, substantially as and for the purpose set forth.

In testimony whereof I affix my signature in presence of two witnesses.

WILLIAM SCHOFIELD.

Witnesses:
S. J. VAN STAVOREN,
CHAS. F. VAN HORN.